Figure 1:
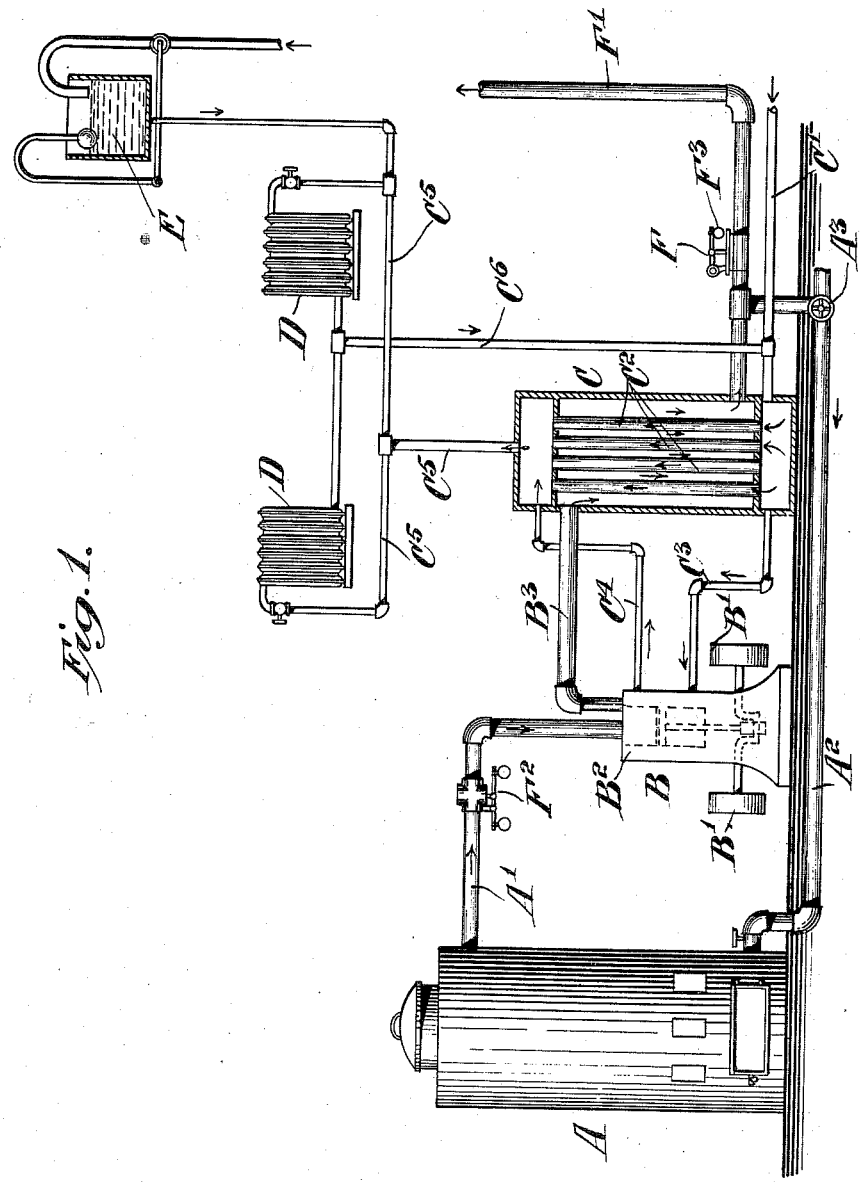

J. M. W. KITCHEN.
HEATING PROCESS AND SYSTEM.
APPLICATION FILED OCT. 30, 1908.

995,154.

Patented June 13, 1911.

3 SHEETS—SHEET 1.

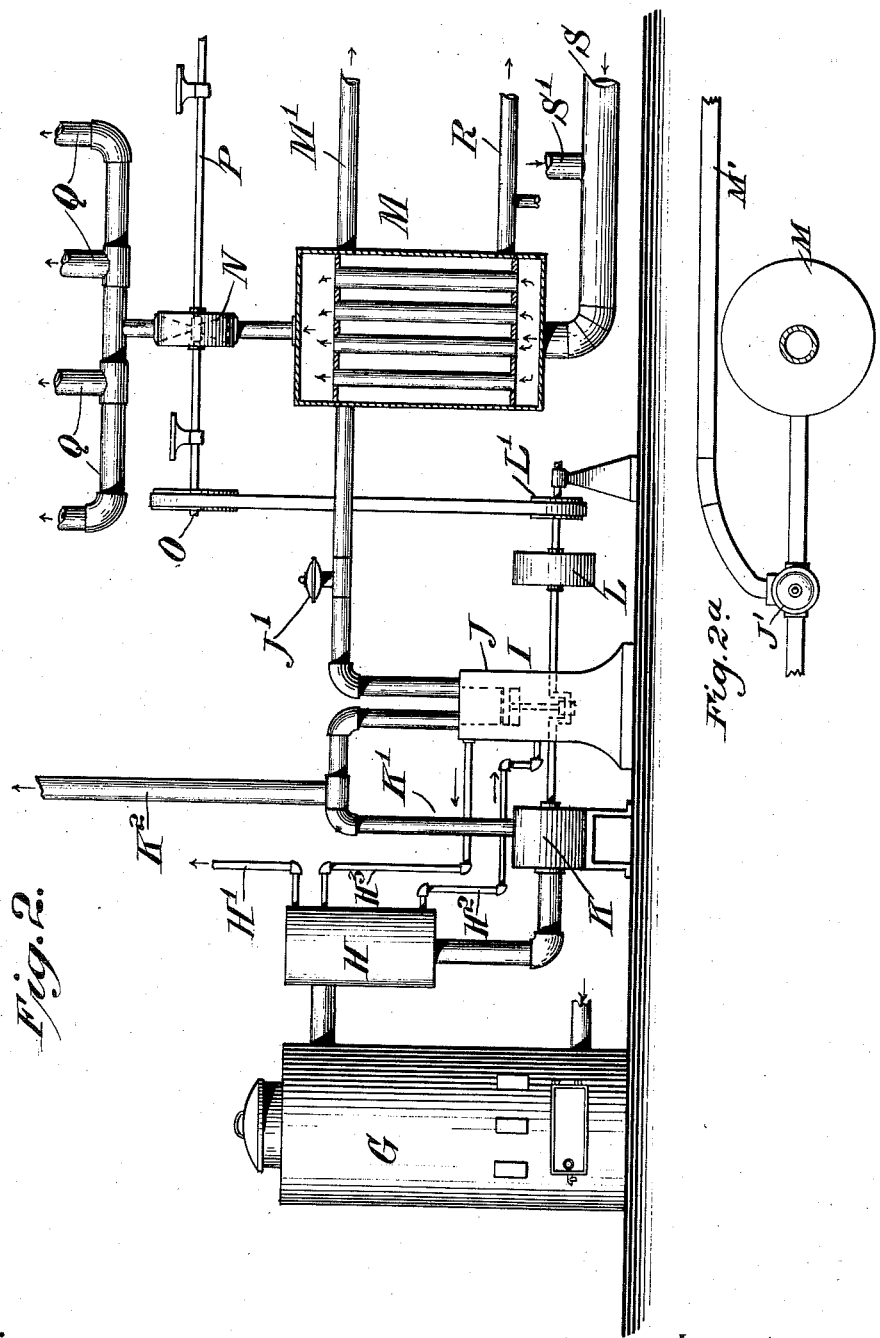

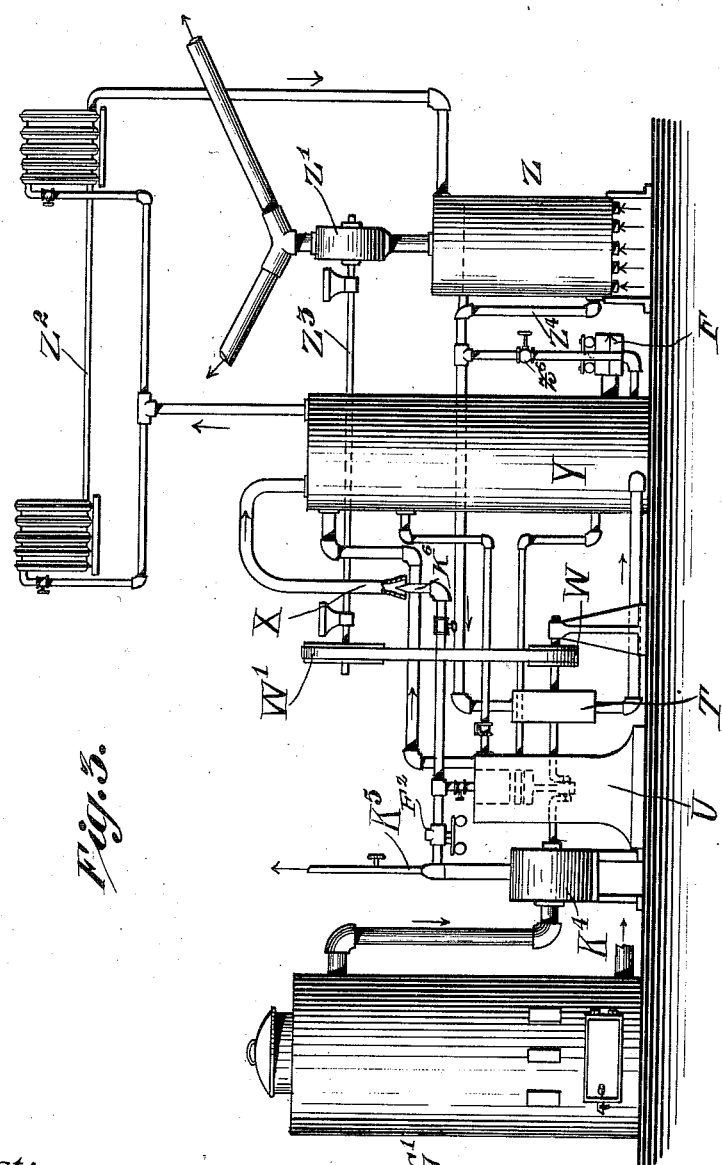

UNITED STATES PATENT OFFICE.

JOSEPH MOSES WARD KITCHEN, OF EAST ORANGE, NEW JERSEY.

HEATING PROCESS AND SYSTEM.

995,154.                Specification of Letters Patent.    Patented June 13, 1911.

Application filed October 30, 1908. Serial No. 460,267.

*To all whom it may concern:*

Be it known that I, JOSEPH MOSES WARD KITCHEN, a citizen of the United States, residing in the city of East Orange, county of Essex, State of New Jersey, have invented new and useful Improvements in Heating Processes and Systems, of which the following is a specification.

The object of this invention is to reduce the fuel cost of heating; to secure the advantages of using a gas fuel; to further many domestic conveniences; and to facilitate many of the various utilities which may be practiced through the use of power in domestic households, in manufacturing processes, in street lighting, in indoor lighting, and in other ways. This object is accomplished by using a cheap grade of fuel, by gasifying the fuel in an internally fired gas generator, by burning more or less of the gas in an internal combustion engine to produce motive power for various uses and heat for heating purposes, transferring the heat of the burning of the gas to some heat conveying medium such as air, steam, vapor or water, and distributing the heat through a heating system in a habitable structure, the motive power of the engine being sometimes only utilized to induce and force a draft in the gas generator and over heating surfaces unusually but favorably arranged to secure exhaustive absorption of the heat generated, and for securing the conveyance of cooled gaseous products to the gas generator for modifying the combustion process, and for their final exhaust. The motive power generated may also be used to mechanically produce positive circulation of the heating medium in connection with means for controlling the amount of that circulation.

I am aware that the exhaust gases and the jacket water heat of the internal combustion engine using high cost liquid and gaseous fuel in power generation, has in the past been used for heating in various ways as an economization of a power-generating waste. An illustration of this use is in connection with automobiles. But I claim broadly as a new invention, the idea of utilizing an internally fired inclosed gas generator charged with solid or liquid fuel to produce a combustible gas, such as carbon monoxid gas or water gas or other fuel gases, from cheap grades of fuel, burning that gas under forced pressure, outside of the gas generator under atmospheric pressure, or in an internal combustion engine in mechanically compressed air, to secure a relatively perfect combustion of the gas and to produce motive power for actuating a mechanically produced draft in the gas generator and in other parts of the mechanism peculiar to heating systems. The application of this advanced idea will, it is believed, found a new art and industry. The invention in this relation lies rather in a new application for the use of old elements, and possibly old combinations though modified in form, to secure a new advance in heating processes that has hitherto not been made. By giving an added functional prominence to the action of certain parts of old combinations for the special purpose of producing heat for heating purposes in heating systems, while only a minor part of the heat of combustion is converted into motive power, such power generation becomes of lesser and even of very minor importance in this connection. I advance a new idea which will be of value in heating processes. The making of producer gas and of other low cost fuel gases and their use in power generation and in metallurgical operations is common; but a reduction to practice of the idea of specially making such gas for the purpose of using the heat of its burning in heating systems is new, when the use of the kinetic energy created from the burning of the gas is only used in connection with the generation of the gas, its burning, the transference of the heat of the burning to a heating medium, and the distribution of the heat through what is ordinarily known as a heating system such as that used in human habitations for the comfort and health of the occupants.

More specifically I claim the process of making producer gas, water gas or other cheap gases, from a very cheap grade of fuel, such as small sized anthracite coal, lignite or peat, and burning the gases in an internal combustion engine so as to secure a better combustion of the gases and the application of the motive power generated in the engine in securing draft positively, both induced and forced; securing a forced circulation of the heat conveying medium used in a heating system; the conversion, when desired, of some of the motive power of the engine back into heat for heating purposes; utilizing for heating purposes the heat of the jacket water and exhaust gases of the engine, and also of the heat of gases generated and mechanically compressed, but burned under atmospheric pressure outside of the engine, for heating purposes.

Various of the essential features that are desiderata in the various systems and devices in which my invention may be applied are of novel design, and the combination and arrangements of parts for securing co-active function are also novel.

In the accompanying drawings, Figure 1 represents in simple form an application of my invention, comprising a gas generator, an internal combustion engine, a water heater, a radiating system, a tank for water supply, water expansion and air exhaust, an automatic gas supply valve and a back pressure valve. This system comprises the piping and radiators necessary for a heating system. Intentionally there is no gas scrubber and cleaner interposed between the gas producer and the internal combustion engine. Fig. 2 represents a method for hot air heating in which my invention is applied, and comprises means for furnishing fuel gas and motive power which may be used for operating a number of domestic and other utilities. Fig. 2$^a$ represents a plan view of part of the structure shown in Fig. 2. Fig. 3 represents a system comprising my invention, providing means for furnishing fuel gas which can be used for cooking, mantle lighting and accessory heating of a heat conveying medium through the burning of gas under atmospheric pressure, motive power for domestic and other utilities, a hot water supply, a water heating system, and a device for supplying pure warmed air for respiration and for cooling feed water.

The features shown in all the drawings may be comprised with advantage in one installation.

The reference characters indicate as follows: A gas generator. $A^1$ gas main for unburned gas. $A^2$ cool burned gas and air feed main. $A^3$ cooled burned gas and air feed cock. B internal combustion engine. $B^1$ fly wheels. $B^2$ water jacket. $B^3$ exhaust conduit to water heater. C water heater. $C^1$ city water main. $C^2$ water tubes. $C^3$ cold water supply for the water jacket. $C^4$ hot water from jacket to water heater. $C^5$ hot water piping to radiating system. $C^6$ cooled water return pipe from radiation to bottom of heater C. D hot water radiator. E expansion and air-exhaust tank. F automatic back pressure valve. $F^1$ exhaust conduit. $F^2$ automatically acting valve for regulating independently the supply of gas to the engine B. $F^3$ valve weight. G gas generator. $G^1$ gas generator. H water heater. $H^1$ hot water conduit. $H^2$ jacket water pipe (inlet). $H^3$ jacket water pipe (outlet). I engine. J jacket. $J^1$ thermostat. K gas blower. $K^1$ gas main. $K^2$ secondary gas main. $K^4$ gas pump for compressing and forcing a flow of gas. $K^5$ gas pipe. $K^6$ gas jet for burning gas under atmospheric pressure. L fly wheel. $L^1$ pulley. M is an air heater. $M^1$ is a high level exhaust gas duct. N is a ventilating fan for the forced circulation of warm air. O pulley. P shaft. Q air distributing conduits. R lower exhaust conduit. S fresh air (inlet) conduit. $S^1$ air conduit from interior space heated. T water circulating turbine. U engine. W pulley. $W^1$ pulley. X accessory heating device for burning gas under an induced atmospheric pressure. This also indicates any kind of an accessory heating device for burning either gas or solid fuel. Y water heater. Z air heater and water cooler. $Z^1$ ventilating fan. $Z^2$ radiating system. $Z^3$ motor shaft. $Z^4$ cooled water pipe, for maintaining high water level in water cooler. $Z^6$ valve.

In further description, and referring to Fig. 1: the gas generator A is of a type designed to suit the nature of the fuel used. If anthracite coal or coke is used, any common form of generator may be used. The gas is drawn from the generator through the conduit $A^1$ into the engine B, with the fly wheels $B^1$, and the water jacket $B^2$. The burned gases are expelled through the exhaust pipe $B^3$ and delivered at an upper level of the water heater C. The circulating water used in the system is introduced into the bottom of the water heater C, and rises through the pipes $C^2$, being heated progressively in its upward travel by the exhaust gases which under forced pressure travel from above downwardly, and which finally find exit through the exhaust pipe $F^1$. The jacket water is conveyed through the pipes $C^3$ into the lower part of the jacket $B^2$ and out through the pipe $C^4$ into the upper part of the water heater C from whence, after further heating from the exhaust gases, it flows upward under the influence of gravity through the piping $C^5$, through the radiators D and back to the lower part of the water heater C through the pipe $C^3$. In installations of large size there would be a mechanically induced return current of the water. The tank E may be used for the water supply of the system in place of the water main $C^1$. The back pressure valve F is introduced in the line of the exhaust to maintain automatically a desired degree of gas pressure in the gas traversing passages, and thus control the activity of the engine through the load carried, and also to secure a transfer of the heat before the hot gases expand. A certain amount of control over the engine is induced by the automatic shrinkage of the heating gases as they pass through the water heater C, due to the varying amount of heat radiated and the resulting coldness of the water in the system. Thus, if the temperature of the space heated declines, more heat is radiated, the water cools and the gas in the heater C shrinks, the pressure against the piston of the engine B is lessened, and the activity of the engine increasing, more gas is generated and burned. It will thus be seen that by varying the position of the pressure weight $F^3$ of the back pressure valve F the speed of the engine and the amount of gas generated and burned and the heat transferred to the water can be regulated. The valve F can be so regulated as to give any desired amount of super-heat to the water in the water heater, and if desired, steam may be used as the bearer of the heat. It is obvious that water of any desired super-heat may be thus circulated, or low pressure water vapor, or steam of any pressure.

In large district plants where hot water is distributed for heating by radiation and for domestic use, cool water from a source outside of the system is forced into the water heater and thus induces increased activity of the engine.

There are numerous ways in which the speed of the engine can be controlled, to prevent its racing and inducing too much draft through the gas generator, and burning too much gas in the engine itself. An automatically acting throttling valve actuated by the suction force of the engine may be introduced between the gas generator and the engine, as indicated by $F^2$. This valve acting in connection with the valve F gives an economic and utilitarian control of the gas generated and burned, and of the heat transmitted, by convection in the water heater and by radiation outside of the water heater. The use of the valve $F^2$ gives a wider range of control than can be exercised by the usual methods of speed control comprised in gas engines.

In a system of this kind the intensity of combustion may be modified by drawing under the grate of the generator, or by forcing over highly heated parts, a certain portion of cooled gases, such as carbon monoxid, mixed with enough air.

In Fig. 1 the regulator valve $A^3$ regulates the relative proportions of cooled burned gas and air for combustion conveyed through the pipe $A^2$. This process of using a cooled gaseous product of combustion is an improvement over the use of an uncooled gas in the modification of combustion in the generator, and in protecting parts from over heating.

In Fig. 2 I have indicated the application of the principles of the invention as applied in connection with a hot air heating system, introducing means for heating hot water for domestic purposes, for distributing fuel gas, a thermostatic control for short circuiting exhaust gases to the exhaust conduit when heat is not wanted in the house, yet providing fresh cool air for ventilating purposes. Means for applying the power of the engine to domestic utilities of various kinds are indicated, such as would be used in mechanical refrigeration, washing, generating electric current, house cooling, vacuum sweeping, etc. In Fig. 2, G represents the gas generator, H represents a water heater, the water from which is delivered through the conduit $H^1$ for domestic uses or other purposes, the water being heated both by the heat of the newly generated gas accentuated by the pressure of the suction draft through the heater, and by the jacket heat. Cool water is introduced into the jacket J of the engine I, the jacket communicating with the water heater H through the pipes $H^2$ and $H^3$. The combustible gas generated, instead of being drawn directly into the engine I may be induced in its flow by the rotary blower K and forced under suitable pressure through the conduit $K^1$ to the engine I, and also through the conduit $K^2$ for accessory heating, domestic usage in cooking, etc. L represents a fly wheel, and $L^1$ a pulley which is belted to the pulley O on the shaft P. Connected with the shaft P is the ventilator fan N, which draws the air through the air duct S up through the air heater M, and then forces it through air conducting pipes Q, which distribute it to the spaces to be heated and ventilated. The exhaust gases from the engine I are delivered into the upper levels of the heater M and travel downwardly therein, and are exhausted through the exhaust pipe R, traveling in vertically descending currents in counter direction to the upward travel of the air. All of the air may be taken directly from the outside atmosphere, or a part of it may be used in cycle, being drawn from inside the building containing the system. By means of a thermostat represented by $J^1$, more or less of the heating gases may be short-circuited through the high level exhaust duct $M^1$.

It will be observed that in systems of this kind various features may be added thereto to carry out more perfectly the requirements of a comprehensive system. Thus, in Fig. 3 provision is made for the production of gas for cooking, motive power, accessory heating through increased elevation of the temperature of the heat conveying medium, a positively pumped water distribution in a hot water heating system; and conversion of the kinetic energy of the engine into distributed heat through forced pressure of the gases against heating surfaces, the introduction of air for respiration, and the application of the principle of cooling feed water in the heating of air for respiration, so that the feed water will be of a sufficiently low temperature to pick up low degrees of heat when introduced at a low level in the water heater, in which there is a counter current travel of the heating gases and water.

In Fig. 3, $G^1$ is the gas generator, $K^4$ is the gas blower for forcing the gas into the gas conduit $K^5$ to the engine U, and to the accessory heater-burner device X with the burner $K^6$, which in conjunction with the exhaust gases of the engine, heats the water in the water heater Y. A sufficient pressure is given the gas by the gas pump $K^4$ so that a suitable concentration of heat can be secured at the point of its burning, as well as a more active induction of air for combustion at the point of burning. In burning producer or other gas low in thermic units the best heating effects are secured by forcing the gas into more or less confined or compressed air, burning the gas with air supplied from outside the flame, instead of premixing air with the gas before its burning as is the case with the burning of rich illuminating gas. The arrangement of the burner X indicates how this outside pressure effect may be secured. This heater-burner device X and $K^6$ may be of any suitable type that will secure a thorough combustion of the gas; but provision is made through the injection effect of the combustible and burned gases to induce not only a sufficient air supply under induced pressure to effect a complete burning of the gas, but also a sufficient supply to dilute when necessary the temperature of the gaseous products of combustion from the burning of the gas in the device and from the engine U to a sufficiently low temperature to prevent destructive action on the metallic conduits conveying the heated gases through the water heater Y, from over-heating, it being well known that under certain conditions, such as when very rich gas is burned, the metal might even be melted by the heat of the products of combustion. Sufficient heating surface would be provided for in the heater Y to absorb the heat of a lower temperature that would be diffused through a larger volume of the gases by their dilution with a sufficient quantity of cool air. When only poor quality producer gas is burned this provision is unnecessary.

In this system the water used for heating can be given positive circulation by the water turbine T, and would be thus forced through difficult arrangements of radiating piping. Air for respiration is drawn through the air heater and water cooler Z by the fan $Z^1$ actuated by the shaft $Z^3$, which gains its motive force through the pulley $W^1$ which is belted to the pulley W. The water passing through the system $Z^2$ is returned into the top of the combined air heater and water cooler Z and passes down to the bottom and out through the pipe $Z^4$ which is connected with the bottom of the water heater Y. Air passes upwardly through the heater Z actuated by the fan $Z^1$, and then is distributed as may be desired. The air conduits in those cases could also be of unusually small size, the heat of friction due to small size, transferring some of the motive power of the engine to warmed air. The ability to use small sized water, steam or air conduits is one of the advantages of this system. In case a system of this nature were applied in a central heating, light and power plant, with street mains and returns, or in large domestic installations, the mains and returns would be protected from loss of heat by radiation and convection.

The scope of this invention must not be considered as being limited to the specific structure diagrammatically outlined in the drawings. Various structural details may be inserted in a system of this nature to advantage, which comprise elements and combinations that are not described, illustrated or claimed herein.

In claiming the use of producer gas in connection with heating habitable structures, I define producer gas as a cheap fuel gas generated in an internally fired gas generator, such gas being in counter-distinction to illuminating or coal gas generated in an externally fired gas retort or gas generator. The nature and quality of the so-called producer gas used would vary according to circumstances. A so-called carbon monoxid gas being best for power generation, while a gas rich in hydrogen is best for heating purposes.

It is obvious that by regulation of the automatically acting pressure valve F, the pressure of the exhaust gases passing through the heater C can be regulated, and that through its action not only can the consumption of the gas fuel of the engine be regulated, but also that the heat generated in the engine by the burning of the gas and transferred to the jacket water and carried out by the exhaust gases and also the kinetic energy of the engine, can almost all be transferred to the water in the heater, and that if the gases are forced through the heater under sufficient pressure the water can be boiled and steam under pressure for heating or other purposes be generated at will. This may be desirable under some circumstances; though in some instances it is most desirable to do accessory heating with crude solid fuel burned under atmospheric pressure.

The heat transferred to the water in the economizer boiler may be distributed through the heating system in hot water, or in water vapor induced as to its flow by a vacuum exhaust, or if preferred in steam under more or less pressure.

It is customary under conditions in which very large amounts of heating is done in connection with the use of a relatively small amount of motive power, that an auxiliary source of heat is derived from any ordinary form of heating device burning fuel directly in it. In such cases, the waste heat of the internal combustion engine can be run in with the heat generated by the direct burning of the solid fuel. The jacket water would be introduced at points in the heating system in which the temperature of the water in the system would be approximately the same as the water jacket, and the exhaust gases from the internal combustion engine would be applied at a high level in the device or at a point where the gases would be higher in temperature than the temperature of the medium to be heated. In such cases the motive force of the internal combustion engine could be made very useful in securing an efficient combustion in the heating device burning fuel directly, through mechanically produced draft.

I draw attention to the fact that in a small sized heating system a very simple, inexpensive and relatively inefficient internal combustion engine of only sufficient size to create a mechanical draft, would be used, while more or less of the heating effect would be accomplished by burning under atmospheric pressure, and outside of the internal combustion engine, some of the gas that is generated in the gas generator. In installations where more motive power is required for domestic utilities and other applications, the size of the engine would be proportionately increased, and a larger proportion of the gas generated would be turned into kinetic energy. In one-engine installations, an auxiliary motor actuated by an outside source of power, electric or otherwise, would be attached to the gas pump to provide against breakdown of the internal combustion engine, and in some cases to initiate motion in the gas engine if the engine is of large size.

In those cases in which a very tall vertically disposed water heater would be used to secure the transfer of the generated heat to the heat distributing mediums such as water or air, a mechanically actuated induction fan introduced into the line of the exhaust pipe of the heater may be needed to overcome the effect of the upward buoyant tendency of the gas traversing the heater. I use this principle of mechanical induction in several of my previous inventions. In water heaters of smaller size, the forcing effect of injected exhaust gases from the engine and of the gas pumped under pressure would be sufficient to convey through the water heater the gaseous products of combustion from the gas burned outside of the internal combustion engine, as well as the exhaust gases from the engine. In such cases when assembling the elements of the invention, the burner device X and the gas conduit ascending from it, would be located at such a low level as would make the force of the ascending heated products of combustion in the conduit conveying the burned gases, greater than the buoyant upward tendency of the cooling gases that are being forced downward through the water heater Y. In most cases where auxiliary heating of the heat distributing medium is desired, an entirely separate heater device is desirable to use. In such systems some provision is usually made for cooling the gas from the generator, utilizing the heat of the cooling; and for separating dust from the gas.

Subject matter is herein disclosed which is not herein claimed, but which is more or less claimed in each of the following co-pending applications:

Serial No. 415983 filed Feb. 24, 1908.
" " 453275 " Sept. 16, 1908.
" " 465966 " Dec. 4, 1908.
" " 482127 " March 8, 1909.
" " 487694 " Apr. 3, 1909.
" " 504132 " June 24, 1909.
" " 504778 " June 28, 1909.

What I claim as new is:

1. The combination of (1) a producer gas generator, (2) a water jacketed internal combustion engine in direct and immediate connection with said gas generator for burning the producer gas generated, (3) a water heater for economizing the waste heat of said engine, said water heater comprising means for receiving the heated jacket water of said engine and for the higher heating of said jacket water and other water by the exhaust gases of said engine, and (4) a heat radiating system for radiating the sensible heat generated in said engine and transferred to said water.

2. The combination of (1) means for generating producer gas, (2) a water jacketed internal combustion engine for burning said gas and producing motive power from the burning of said gas, (3) means comprising a jacket water conduit, a gas conduit and a vertical-counter-current boiler for transferring the sensible heat of said burning to a heating medium, (4) means comprising a heating system for distributing in said structure the heat transferred to said heating medium, and (5) means auxiliary to said engine for heating a single heat distributing medium, said combination of elements being arranged for transferring the sensible heat generated in said engine and of said auxiliary means of heating to said single medium for heat distribution, said combination comprising means for controlling the temperature of the distributed heating medium and for controlling the volume of heat distributed in said structure.

3. The combination with a habitable structure of (1) a gas generator, (2) an internal combustion engine for burning the gas generated and for creating heat and motive power, (3) a heating system for heating the habitable spaces in said structure, said heating system comprising means for the transference of heat of burned gas to water, means for distributing the heat through said heating system, means for radiating the heat from said system and means for returning water of condensation or cooled water to a water cooler and air heater, (4) said water cooler and air heater for cooling water that may have been used in conveying and distributing heat through said system and for heating air through the cooling of said water, and (5) means for returning said water after its cooling to said system in a place that will allow the water to absorb the lower degrees of heat in the exhaust gases from said engine.

4. The combination with a habitable structure of (1) a producer gas generator, (2) a water jacketed internal combustion engine for burning some of the gas generated, (3) a gas exhauster and pressure accelerator for exhausting a flow of gas from said gas generator and for forcing and distributing said gas to places for burning, (4) means auxiliary to said engine for burning said gas, (5) means comprising a jacket water conduit and a vertical counter-current water boiler for transferring the heat generated in said engine and from said auxiliary means to a heating medium, and (6) means for distributing the heat generated in said engine and in said auxiliary means to and through said habitable structure for heating said structure.

5. The combination with a habitable structure of (1) a gas generator, (2) a water jacketed internal combustion engine for burning some of the gas generated, (3) means for exhausting the gas and forcing it to places for combustion, and for its burning at said places of combustion, (4) means comprising a jacket water conduit and a vertical-counter-current boiler for the transference of the heat generated by said burning to and through a heat distributing system, (5) said heat distributing system which is located in said structure, and (6) means for utilizing some of the gas in producing motive power whereby useful work may be performed.

6. The combination with a habitable structure of (1) a producer gas generator, (2) a water jacketed internal combustion engine for burning the gas generated, (3) a vertical-counter-current water heater for absorbing the heat of the exhaust gases from said engine and for the higher heating of the jacket water of said engine, (4) a heating system conveying a medium for distributing the heat absorbed in said water to and through spaces in said habitable structure, and (5) means for conveying said medium through said water jacket and to said water heater for re-heating.

7. The combination of (1) means for making a combustible gas, (2) means for burning some of said gas for creating heat and motive power, (3) a boiler arranged for the vertical-counter-current travel of heating gases and water for absorbing the heat generated by said second named means, (4) means for burning more of the gas and further means for conveying to the water in said boiler the heat created by said last named burning means, said burning means comprising means for securing combustion through a mechanical forcing and intermingling of said gas with air at or before the point where the burning of said gas in air occurs, and (5) a heating system for distributing the heat generated in the two named means for burning the gas.

8. The combination with a heating system of (1) a producer gas generator, (2) a water jacketed internal combustion engine for producing heat and motive power for use in said system from the burning of some of the gas generated, (3) a boiler for economizing the heat of said burning by heating water, said boiler comprising means for the vertical-counter-current travel of water and heating gases, and (4) means for securing the further heating of the water in said boiler by the burning of more of said gas and for distributing the heat generated in said burning, said last named means comprising a mechanism for varying the amount of gas burned through the action of a mechanically produced pressure of the gas burned and induction of the air for the combustion of the gas, and (5) means for the progressive heating of said water through a mechanically produced plunging travel through said boiler of the heated gaseous products of combustion.

9. The combination with a heating system of (1) a gas generator, (2) means for burning the gas generated in said generator, (3) means for transferring the higher degrees of heat of said burning to water and applying the heat thus transferred to useful work, and (4) means for transferring the lower degrees of heat of said burning to air and for utilizing for useful purposes the air thus heated.

10. The combination of (1) a generator of heated burned gases, said generator comprising a combustion chamber and other means for accurately securing a properly proportioned admixture of air and combustible gas and for burning said air and combustible gas in said combustion chamber, (2) a heat interchanger other than the water jacket of an engine, for heating a fluid and generating pressure in the fluid with the heat of the burned gases, said heat interchanger comprising an exit orifice for the burned gases, and (3) means for forcing the burned gases through the heat interchanger and for preventing the expansion of and otherwise controlling the expansive pressure of the burned gases while in the heat interchanger, said combination comprising means for mechanically compressing gases and for forcing gases into said combustion chamber and into said heat interchanger and for controlling the rate of passage of the gases through said exit orifice.

11. The combination with a habitable structure of (1) a gas generator for generating gas from solid fuel, (2) a water jacketed internal combustion engine for inducing a flow of and for burning the gas generated for producing heat and motive power, (3) means for exhausting said gas from said gas generator and for forcing the gas to various places for burning, and (4) means comprising a jacket water conduit and a vertical-counter-current boiler for utilizing the sensible heat generated by the burning of said gas in heating said habitable structure.

12. The combination with a habitable structure of (1) a producer gas generator and mechanical means for drawing gas from the generator and for forcing and distributing the gas generated to places of use, (2) a water jacketed internal combustion engine for burning the gas generated for creating motive power for draft creating purposes and heat for heating purposes, (3) means comprising a jacket water conduit and vertical-counter-current boiler for transferring the heat of said engine to a medium for distributing heat, (4) a system for distributing the heat in said medium and for heating designated places in said habitable structure, and (5) means for utilizing part of the motive power of said engine for purposes other than draft creation.

13. The combination with a heating system for conveying a heating medium of (1) a gas generator, (2) a water jacketed internal combustion engine for burning the gas generated in said generator, (3) means comprising a jacket water conduit and vertical-counter-current water heater for transferring the waste heat of said internal combustion engine to said heating medium and for the distribution of said heat through said heating system, and (4) means comprising a pressure valve for varying automatically the control of the rate of the running of said internal combustion engine by variation in the load to be overcome in forcing a current of heating gases.

14. The combination of (1) a producer gas generator, (2) a water jacketed internal combustion engine for burning the gas generated, (3) a vertical-counter-current water heater and boiler for utilizing the jacket water heat and exhaust gas heat of said internal combustion engine for heating a heating fluid, (4) means accessory to said internal combustion engine and vertical-counter-current heater for the further heating of the heating fluid, and (5) means for utilizing for heating purposes the two sources of heat heating said fluid.

15. The combination of (1) a gas generator for gasifying solid fuel, (2) means for burning said gas, (3) means comprising a vertical-counter-current fluid heater and a heat distributing system for distributing the heat generated through said burning in the heating of said structure, and (4) means for controlling and modifying the nature of combustion in said generator, and of the gas therein generated.

16. The combination with a habitable structure of (1) a producer gas generator, (2) an internal combustion engine for burning the gas generated in said generator, (3) means for transferring the heat of said burning to a heat conveying medium, (4) a heating system for circulating the heat conveying medium and distributing the the heat of said medium in required places in said structure, and (5) means for maintaining positively and controlling a ventilating current of air for respiration in connection with the heat distribution of said heat distributing system.

17. The combination with a habitable structure of (1) means for generating combustible gas from a thick bed of fuel, (2) means for the mechanical admixture of air with said combustible gas under compression for its combustion, (3) means for conveying the heat of said combustion to a heat absorbing medium and for distributing positively said heat absorbing medium through a radiating system, (4) said radiating system which is located in said structure, (5) means for returning said medium from said radiating system for re-heating to said means for conveying heat to said medium, and (6) means for mechanically inducing a draft and for accelerating the distribution of said medium distributed by said third named means.

18. The combination with a composite heat and power system of (1) means for generating a combustible gas, (2) means for burning said gas with air in a confined cavity for producing motive force and heat, (3) means for applying the expansive force, generated by said burning to actuate the driven motors in said system in inducing and forcing draft and in securing ventilation and a positive circulation of the heat distributing medium, (4) the motors for forcing draft and inducing draft and for securing ventilation and positive circulation of the heat distributing medium, (5) a heating system for distributing said heating medium and for radiating and distributing the heat generated in said system, (6) means for returning said medium for re-heating to a heat distributing medium heater, and (7) said heat distributing medium heater.

19. The combination with a habitable structure of (1) a gas producer, (2) an internal combustion engine for burning the gas generated, said engine having a water jacket, (3) a water heater for economizing the heat of the engine jacket water and waste gases, said water heater comprising means for transferring at a high level of said heater the heat of the exhaust hot gases of said engine to the jacket water heated in said jacket for increasing the heat of said jacket water, said heated jacket water being introduced in said water heater at a high level, and (4) means for utilizing the combined heat of said jacket water and said gases for heating purposes in said structure.

20. The combination of (1) means for generating combustible gas, (2) means for creating motive power from burning said gas, (3) means for producing draft mechanically and for mechanically actuating and accelerating a circulatory current of a heating medium, and (4) means for heating said medium with the heat generated from the combustion of said gas, said last named means comprising further means for securing a vertically plunging travel of the gases carrying heat generated from the combustion of said gas in vertical-counter-current to the travel of the medium to be heated.

21. The combination with a habitable structure of (1) a producer gas generator, (2) an engine for creating mechanical draft and doing other work in said system through burning the gas generated, (3) means for transferring the heat generated in said combination to a heat conveying medium for heating purposes, (4) means for burning gas under atmospheric pressure for the further heating of said medium, said latter means comprising further means for first inducing an upward flow of gaseous products of combustion to said heat transferring means and then a downward flow of the gaseous products of combustion through said heat transferring means, and (5) a system for distributing said heat conveying medium for heating said habitable structure.

22. The combination with a habitable structure of (1) means for generating producer gas, (2) a gas exhauster and pressure accelerator for drawing gas from said generator of producer gas and for forcing said gas to places for burning, (3) an internal combustion engine for creating motive power from the gas generated, (4) means for conveying the heat of the burning of said gas to a heat conveying medium, said last named means comprising a burner device for the proper admixture of air with the gas compressed by said second named means whereby a relatively perfect combustion of said gas is secured, and (5) a heating system in said habitable structure for distributing the heat transferred to and conveyed to said heat conveying medium.

23. The combination with a habitable structure of (1) a gas generator, (2) an internal combustion engine for burning the gas generated for creating mechanical draft in said generator and doing other motive work, (3) means for burning the gas under atmospheric pressure and transferring the heat of the burning under atmospheric pressure to a heat distributing medium and (4) means for distributing said heat in said habitable structure, said means for burning the gas comprising further means for mixing the gas with proper amounts of air to secure the complete burning of the gas and comprising other means for a sufficiently long route of travel of the gas and air when burning to give time for the complete combustion of the gas before the burning gas is brought in contact with surfaces absorbing and transmitting said heat to said heat distributing medium.

24. The combination of (1) a gas generator, (2) means for exhausting and forcing the gas generated, (3) an internal combustion engine for burning the gas and producing kinetic energy, (4) a circulating means actuated by said engine for circulating a heat conveying medium, (5) means other than said engine for heating said medium, (6) means for transferring the heat of the burning of said gas to a heat conveying medium, (7) a radiating system for radiating the heat conveyed in said medium, (8) an air heater and water cooler for heating air for respiration and cooling water, and (9) piping and air conduits for connecting and securing the co-action of the several cited elements.

25. The combination of (1) a gas generator, (2) an internal combustion engine for burning the gas generated, (3) a gas pump for inducing a flow of gas from said generator and for compressing said gas and for forcing said gas to said engine and to places of work elsewhere than in said engine, (4) a water heater for transferring to water for heating purposes the heat generated in said system, (5) a pump for creating positively a circulation of said water in said system, (6) means comprising gas conduits for conveying said gas to the places where said gas is used, (7) a combined feed-water cooler and air heater for cooling water for use in said water heater and for the heating of fresh air for respiration, (8) distributing conduits for said air for respiration, (9) means for conveying said cool feed-water to said water heater, and (10) a pipe distributing and radiating system for circulating and distributing the heat transferred in said water heater and for returning said water through said water cooler to said water heater, said water heater comprising means for the heating of said water through the counter-current travel of the water to be heated and the travel of the medium for conveying the heat generated in said system and transferred to said water.

26. The combination with a habitable structure comprising a heating system, of (1) a producer gas generator, (2) an internal combustion engine comprising a water jacket for burning the gas generated and producing motive power and heat for heating, (3) means for the higher heating of the water that has passed through said jacket by the hot exhaust gases of said engine, (4) means for the auxiliary heating of the water heated in said jacket and by the hot exhaust gases, (5) means for circulating in said heating system the medium bearing the heat transferred to said water and for controlling the temperature of the medium heated, and (6) means for returning the water that has passed through said heating system to said jacket for re-heating.

27. The combination of (1) means comprising an internally fired gas generator for generating a fuel gas, (2) an engine and other means for inducing a flow from said generating means and for forcing said gas to a place of heating in a habitable structure, (3) a gas main for connecting said gas generating means and said structure for conveying gas for heating purposes therethrough, (4) said habitable structure, and (5) a heating system comprising a vertical counter-current heat interchanger in said habitable structure for burning said gas and heating a heat absorbing and conveying medium and for distributing the heat generated by the burning of the gas.

28. The combination of (1) means for generating a fuel gas, said means comprising an internally fired gas generator, (2) an engine and other means for inducing a flow from said gas generating means and for forcing said gas to a place for burning and heating a habitable structure, (3) means for connecting said cited elements and said habitable structure, (4) said habitable structure, and (5) a heating system in said habitable structure for burning the gas and heating a heat absorbing and conveying medium and for distributing the heat of the burning of the gas, said heating system comprising a vertical counter-current heat exchanger for transferring the heat of hot gases to the medium heated.

29. The combination of (1) an internally fired gas generator, (2) means for mechanically inducing a flow of gas through said generator and for forcing said gas to a place of burning, (3) means for burning said gas in air, said last named means comprising further means for protecting the air in which the gas is burned from unnecessary dilution with air not needed for combustion and for securing a pressure equal to or above atmospheric pressure of the air used in burning the gas, (4) means for conveying away from the place for burning the gas the gaseous products of combustion of the burned gas as fast as may be necessary to prevent interference with the complete combustion of the gas, and (5) means for using for heating purposes the heat generated by the burning of the gas.

30. The combination of (1) a generator of combustible gas, (2) means for the mechanical forcing of the generated gas to a place of burning, said means comprising further means for producing motive power from the burning of the gas generated, (3) means for utilizing the waste heat emanating from said first named means, and (4) means for burning the gas for heating purposes.

31. The combination of (1) means for gasifying a fuel, (2) a heater for heating a fluid heat absorbing and heat conveying medium, (3) means separate and apart from an internal combustion engine for burning the gasified fuel under a state of pressure greater than the pressure of the atmosphere and for transferring the heat of the burning of the gas under pressure to and through a heat transmitting surface to a heat absorbing and heat conveying medium, said last named means comprising further means for accurately supplying and mixing with said gas amounts of air for combustion to secure a substantially perfect combustion of said gas, and (4) means for the control of the exit for the burned gases that have passed through said second named means.

32. The combination of (1) a gas generator, (2) an internal combustion engine for burning the gas generated and exhausting waste heat, (3) means for securing the transference of the heat in the exhaust gases of the internal combustion engine to a fluid heat absorbing and heat conveying medium, and (4) means for maintaining a substantially undiminished pressure of the exhaust gases in the means for transferring the heat of said exhaust gases to said fluid medium, whereby the intense heat from the exhaust gases is transferred before much of said waste heat becomes insensible through the expansion of the gases under atmospheric pressure.

33. The combination of (1) a gas generator, (2) an internal combustion engine for generating motive power from the gas generated, and (3) an economizer heater for economizing through absorption the heat in the hot gases exhausted from said internal combustion engine, said economizer heater having an inlet for the hot gases and an outlet for the gases that have lost heat to a medium heated in said heater, the outlet of said heater being sufficiently contracted to preserve internally in said heater a higher than atmospheric pressure in the exhaust gases of said engine, whereby said gases are kept in a state of compression in said heater until the purpose has been effected of securing the transference of the high sensible heat in the gases to the heat absorbing medium in said heater.

34. The combination of (1) a gas generator and a water jacketed internal combustion engine, (2) a gas cooler and water heater for cooling the gas generated and heating water, (3) means for more highly heating the jacket water by the exhaust gases heat of the internal combustion engine, (4) means for the final heating of the water with accessory heat of the highest desired intensity, and (5) means for applying in work the total heat thus applied to said water.

35. The combination of (1) a gas generator, (2) a water jacketed internal combustion engine for using the gas, (3) means for combining the heat of the jacket water of said engine and the exhaust gases of said engine, (4) means for securing the radiation of the heat thus combined, and (5) means for controlling the degree of compression of the gas exhaust of said engine and for controlling the amount of fuel burned in said engine, whereby the amount of heat radiated is also controlled.

36. The combination of (1) a gas generator, (2) a gas engine for using the gas generated, (3) a heat exchanger for heating water with exhaust heat of the gas engine, (4) an automatically acting valve located between the gas generator and the gas engine for controlling the gas supply to the engine, and (5) an automatically acting valve other than the first named valve for controlling the pressure of the gaseous products of combustion from the engine passing through the heat exchanger.

JOSEPH MOSES WARD KITCHEN.

Witnesses:
GEO. L. WHEELOCK,
ELIZABETH B. KING.